Patented Sept. 18, 1951

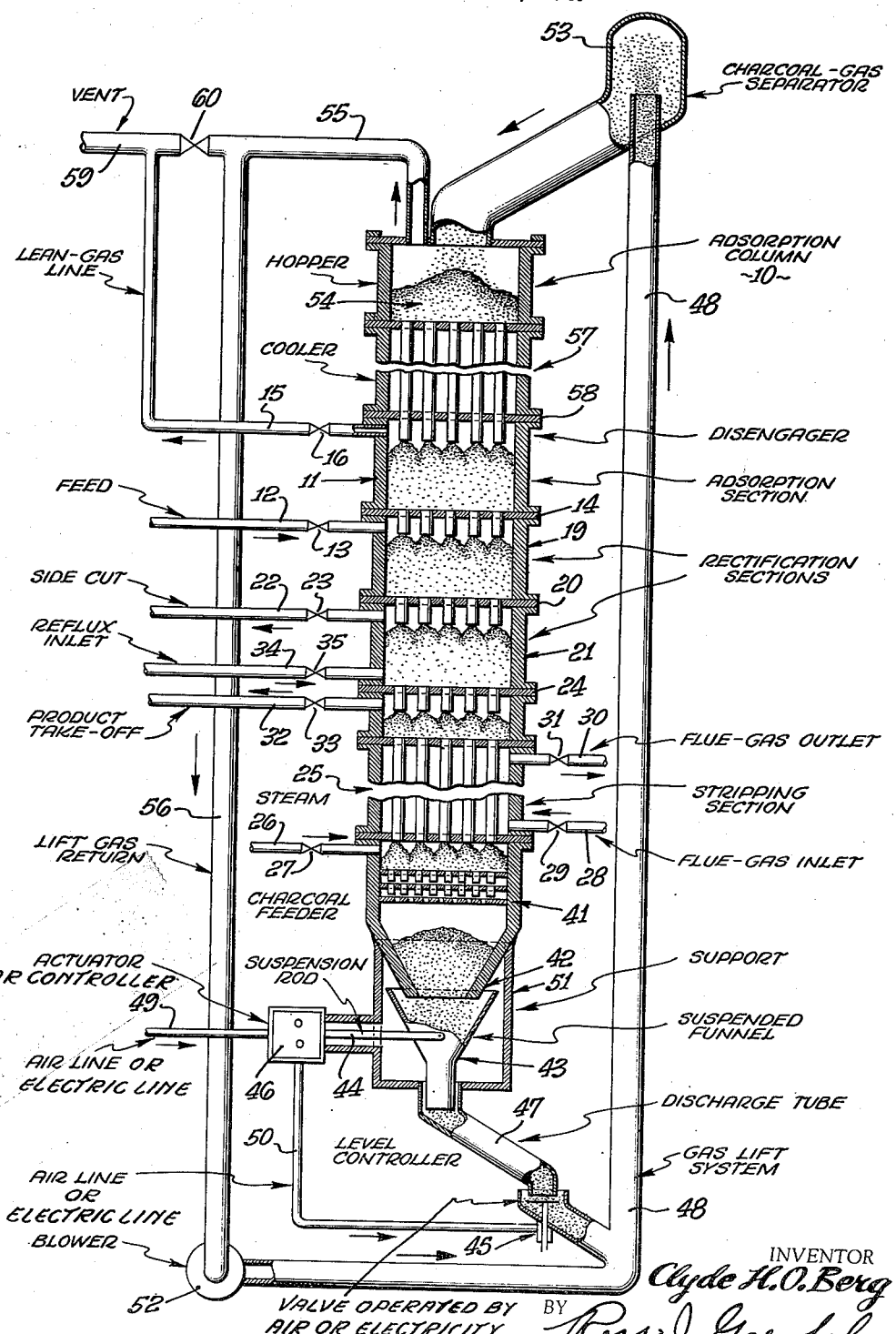

2,568,379

UNITED STATES PATENT OFFICE 2,568,379

LEVEL CONTROL

Clyde H. O. Berg, Long Beach, Calif., assignor to Union Oil Company of California, Los Angeles, Calif., a corporation of California Application November 26, 1945, Serial No. 630,906

12 Claims. (Cl. 183—4.2)

This invention relates to a level control for granular solids whereby the level of such solid may be controlled or maintained at any desired point within vessels, sealing legs, pipes, etc. Further, the invention relates to the separation of gaseous mixtures by selective adsorption of certain of the components of such mixtures on a granular solid adsorbent and applies particularly to the usage of the hereinafter described level controller in the adsorption processes.

In the utilization of moving beds of granular or powdered solid material, such as for example, as employed in many catalytic processes such as catalytic cracking, dehydrogenation, or the like, and in various other applications such as selective adsorption of liquids or gases on a moving bed of a solid granular adsorbent such as charcoal, silica gel, alumina or the like, the problem of accurate control of the pressure within such vessels is encountered. This pressure is controlled or maintained within the vessel by means of a sealing leg at the top or bottom thereof wherein a fixed quantity of the granular solid moving through the vessel is maintained in a continuous column so as to seal the vessel from the remainder of the system. The required length of such sealing legs; that is, the column of granular solid necessary to isolate the reactor or adsorption column from the remainder of the system is a function of the pressure differential between the various points of the system.

It is highly desirable in the utilization of such sealing legs to be able to accurately control and maintain the level of the granular solid within such sealing legs so as to maintain a constant pressure within the vessel. This is particularly true in those instances in which a flow controller or solids feeder is employed within the vessel to control the rate of flow of the granular adsorbent or catalyst flowing therethrough. For the effective use of such a flow controller or feeder it is necessary that a free space be provided within the adsorption column or catalyst reactor directly below the flow controller and yet at the same time it is necessary to maintain a constant level of solids in the lower portion of the column or in the sealing leg at the lower end of the column in order to maintain a constant pressure within the adsorption or catalytic vessel and to prevent the leakage of gases from the remainder of the system into the bottom of the column. The present invention is directed to a device for controlling the level of such granular solids. By the term "granular solids" is meant any granulated or powdered material which is capable of being handled as a quasi-fluid.

The invention finds particular application in selective adsorption processes wherein a gaseous mixture to be separated is flowed countercurrently to a granular solid adsorbent, such as charcoal, silica gel, alumina, or the like in an adsorption column. It is known that certain solid adsorbents such as for example activated charcoal or silica gel will adsorb some gases such as water vapor, benzene vapor, butane, and the like, more readily than they will other gases such as hydrogen, nitrogen, methane, and the like, and that by heating the enriched adsorbent containing the adsorbed gases, these gases may be liberated substantially completely therefrom and the adsorbent after being cooled is capable of further selective adsorption. This has led to the development of various processes for the separation of gases involving adsorption on solid adsorbents, heating the enriched adsorbent to liberate the adsorbed bases and cooling the thus regenerated adsorbent for further use. Such adsorption processes are most effectively carried out by a countercurrent flow of the solid adsorbent and the gaseous mixture to be separated whereby the adsorbent flows through an adsorption zone, one or more rectification zones, a stripping zone, a cooling zone, and from thence back to the adsorption zone. In general, these functions are carried out in one or more columns making it necessary to discharge the charcoal from the bottom of one column to be reintroduced at the top of the same column or at the top of a second column which may contain for example the stripping zone. In either case it is necessary to effectively seal the column to prevent escape of gases therefrom or the leakage of gases into the column at the point of discharge of the solid adsorbent. This seal is most effectively accomplished by means of a sealing leg through which said adsorbent must flow maintaining therein a column of the adsorbent sufficient to induce a pressure drop therethrough of a magnitude calculated to prevent the flow of gases either in or out of said adsorption column. The present invention is directed primarily to a means of controlling the level of the solid adsorbent in such sealing leg so as to maintain a continuous seal at the bottom of said adsorption column.

It is therefore an object of the present invention to provide an apparatus for the control of the level of granular solids within a sealing leg, vessel, or the like, which is more accurate and at the same time less complicated than heretofore known methods.

It is a further object of my invention to provide a process and apparatus for the selective adsorption and segregation of gaseous mixtures wherein the discharge point of the adsorbent from the adsorption column or from the stripping column, if the operation is carried out in two columns, is provided with the hereinafter described level control to effectively prevent egress or ingress of undesirable gases at the point of adsorbent discharge.

Further objects and advantages of my invention will become apparent to those skilled in the art as the description thereof proceeds.

Briefly, the level control of my invention involves the combination of a receptacle suspended beneath the point of discharge of granular or powdered solids from a vessel, pipe or the like, by a lever arm which actuates, through the medium of an air or electric control, a control valve, such valve being located at the lower end of the desired column of granular solids. The apparatus is operated by the static pressure caused by the weight of the column of granular solids above the described receptacle which operates the suspension arm connected with the air or electrical controller, the sensitivity of which may be adjusted so as to predetermine the point at which the level of the granular solid will be maintained.

The elements of my invention may be more fully comprehended by reference to the drawing in which the level control is shown in conjunction with a selective adsorption apparatus as shown in cross section in the drawing, and for purposes of convenience the operation of said level control will be described with respect to its relation to the selective adsorption process. It should be understood, however, that the usage of the level control of this invention is not confined to its application in a selective adsorption process but is merely described in relation thereto in order to more clearly portray its method of functioning and the advantages thereof.

Such an adsorption apparatus may be employed for the separation of any gaseous mixture by selective adsorption on a suitable adsorbent such as granular charcoal and for the purposes of the description of the process it will be assumed that the gaseous mixture to be separated comprises methane, and $C_2$, $C_3$ and $C_4$ paraffins and olefins, which mixture may or may not contain small amounts of lighter and heavier gases. Referring to the drawing, said gaseous mixture is introduced to the adsorption section 11 of adsorption column 10 by means of line 12 controlled by valve 13 and is distributed within the adsorption section 11 by means of disengager 14. Disengager 14, as well as the other disengagers in the column may be any desired type such as for example the tube plates as shown in the drawing. A solid bed of granular charcoal is caused to flow downwardly through the adsorption column at such a rate in relation to the feed rate that substantially all of the ethane, ethylene and heavier hydrocarbons are adsorbed by the charcoal in the adsorption section 11 while the methane and any lower boiling gases which may be present in the feed pass upwardly in the adsorption section and may be withdrawn therefrom by means of line 15 controlled by valve 16. The amount of lean gas withdrawn from adsorption section 11 may be controlled so as to force the passage of a portion of the lean gas through the tubes of the cooling section immediately above as hereinafter described.

With respect to the further handling of the charcoal and the gases adsorbed thereon many variations may be employed depending upon the type and degree of separation desired. In the simplest adsorption processes, the charcoal containing the hydrocarbons other than methane may be introduced directly into the stripping section wherein these hydrocarbons are stripped from the charcoal, such a process resulting in only partial separation of methane and lighter gases from the $C_2$ and heavier hydrocarbons. In another method of operation the enriched charcoal may be introduced into a rectification section wherein it is refluxed with further quantities of $C_2$ and heavier hydrocarbons to effect the desorption of residual amounts of methane and lighter gases which may have been desorbed by the charcoal in the adsorption section. Such a process results in the recovery of a hydrocarbon fraction containing less methane and lighter gases as impurities than in the process in which adsorption and stripping comprise the entire operation. In a newer and more efficient method of performing the separation of gases by selective adsorption two or more rectification sections are employed each of which is provided with a different hydrocarbon reflux resulting in the recovery not only of a comparatively methane free hydrocarbon fraction from the stripping section of the operation but further of one or more heart cuts from the feed which are comparatively free of either lower or higher boiling hydrocarbon components. It is this latter method of operation that is illustrated and described herein, but it should be emphasized that the level control employed in conjunction therewith may be used equally effectively in any type of adsorption process.

Returning to the drawing the saturated charcoal passes from adsorption section 11 through disengager 14 into the rectification section 19 wherein equilibrium is established between the methane and lighter gases which may have been adsorbed, and the $C_2$ and heavier hydrocarbons by refluxing the charcoal with $C_2$ hydrocarbons which are desorbed from the charcoal at a point lower in the column. Thus, in the rectification section 19 any residual methane or lighter gases which may have been adsorbed by the charcoal passing downwardly through disengager 14 are desorbed by virtue of the selective adsorption exhibited by the charcoal for the $C_2$ hydrocarbons which are caused to pass upwardly through disengager 20 into the rectification section 19. The desorbed methane and lighter gases then flow upwardly countercurrent to the charcoal through disengager 14 returning to adsorption section 11.

The charcoal substantially free of such lighter components passes from rectification section 19 through disengager 20 into a second rectification section 21. In rectification section 21, the charcoal is refluxed with heavier components in the feed, i. e., $C_3$ and $C_4$ hydrocarbons to effect the desorption of the $C_2$ hydrocarbons from the charcoal. The level of the $C_3$-$C_4$ reflux may be controlled at a given point within the rectification section 21 by utilization of the temperature rise within the section resulting from the heat of adsorption of the $C_3$ and $C_4$ hydrocarbons therein. By injecting, or otherwise introducing $C_3$ and $C_4$ hydrocarbons into the rectification section 21 to serve as reflux therein the $C_2$ hydrocarbons are desorbed due to the preferential adsorption of the heavier hydrocarbons, and the $C_2$ hydrocarbons flow upwardly in the section whereby a portion of the $C_2$ hydrocarbons may be removed from rectification section 21 by means of line 22 controlled by valve 23. However, all of the $C_2$ hydrocarbons are not removed, a portion being caused to flow upwardly through disengager 20 into rectification section 19 to accomplish the double purpose of refluxing the charcoal in rectification section 10 to effect the desorption of the methane and lighter gases as above described, and at the same time to insure a continued retention on the charcoal flowing downwardly through disengager 20 of the heavier components of the feed so as to prevent any desorption of these heavier components in the upper portion of rectification section 21, inasmuch as such desorption would adversely affect the purity of the heart cut obtained. In this manner a heart cut is obtained comprising a comparatively pure mixture of ethane and ethylene.

The charcoal substantially free of the $C_2$ hydrocarbons and lighter gases passes from rectification section 21 through disengager 24 into the stripping section 25. In stripping section 25 the charcoal flows through the externally heated tubes and is contacted therein by steam flowing upwardly within the tubes countercurrent to the downward flow of charcoal. This steam is introduced at the lower portion of stripping section 25 by means of line 26 controlled by valve 27. The tubes in stripping section 25 through which the charcoal must flow are heated externally by means of flue gas, or the like, which is introduced to the section by means of line 28 controlled by valve 29 and is removed therefrom by means of line 30 controlled by valve 31. The steam passes countercurrently to the heated charcoal through the stripping tubes, strips the hydrocarbons from the charcoal and the steam and the hydrocarbons are removed from the column at disengager 24 by means of line 32 controlled by valve 33. At this point alternative methods of procedure may be followed: In one, a portion of the steam-hydrocarbon mixture may be caused to flow upwardly through disengager 24 to act as reflux in rectification section 21, as described above, or preferably all of the steam-hydrocarbon mixture may be removed by means of line 32, the hydrocarbon separated from the steam and reintroduced into the lower portion of rectification section 21 by means of line 34, controlled by valve 35. This latter method of furnishing reflux to rectification section 21 is preferred inasmuch as it has been found that a dry reflux is more efficient than a steam containing reflux. The charcoal passing through stripping section 25 flows into the lower portion of the column at which point the rate of flow of the charcoal is more conveniently controlled. Any desired means of controlling this flow may be employed such as charcoal feeder 41 shown in the drawing, or the like. The charcoal passes through feeder 41 into the lower portion 42 of the adsorption column which may be conical as shown, from whence it flows into the level control apparatus of the present invention.

The essential elements of the level control are the suspended receptacle 43, suspension rod 44, discharge tube 47, the air operated valve 45, and the actuator 46. The suspended receptacle may be of any desired shape, such as the funnel herein shown, providing that it furnishes a passage for the granular solids so flow from the bottom of the column or vessel to the discharge tube and a restriction in the flow thereof whereby the static pressure on the receptacle will be proportional to the quantity of granular solids accumulated therein and in the vessel above. Funnel 43 empties into discharge tube 47 in which the charcoal is maintained by means of valve 45 which allows sufficient charcoal to flow into the gas lift system 48 to maintain the charcoal in lower portion of column (10) at a constant level. Funnel 43 is suspended by suspension rod 44 which connects the funnel with the actuator 46. This actuator may be either air operated or electrically operated, air operation being preferred inasmuch as continuous control may be obtained whereas if operated electrically the control of valve 45 will be intermittent. The drawing shows an air operated actuator in which air is introduced by means of line 49 and is released therefrom by means of suspension rod 44 into the air line 50 which operates the air operated valve. The drawing also illustrates an electrically operated system in which the electric power is supplied through line 49, is regulated by the movement of suspension rod 44, and conducted through line 50 to operate valve 45. By mechanically controlling the sensitivity of the actuator the static pressure on the funnel 43 required to induce initiation of the operation of valve 45 may be varied within broad limits depending upon the size of the funnel and other parts of the apparatus. The discharge tube and actuator may be attached to the adsorption column in any desired manner such as by support 51 as shown. The length of the column of charcoal forming the sealing leg as previously described, is dependent upon the distance between the suspended funnel 43 and the valve 45; i. e., the length of discharge tube 47 and may be varied in accordance with the pressure differential between the gas lift system and the adsorption column. Also the level of the charcoal held up by the funnel may be controlled by adjustment of the sensitivity of the actuator and thus will vary with the static pressure necessary to cause the funnel to actuate the controller or actuator. Although this level may be in the funnel itself I have found that better control is obtained by maintaining the level in the bottom of the adsorption column as illustrated in the drawing. This advantage is particularly noticeable in those cases in which an intermittent charcoal feeder is employed such as feeder 41 for the effect of each discharge of charcoal into the bottom of the column is not as readily transmitted to the control valve 45 as is the case when the charcoal level is maintained within the funnel itself. Thus, apparently due to the damping effect of a larger quantity of charcoal, the discharge from valve 45 is substantially constant when the charcoal level is maintained in the lower portion of column 10.

The charcoal flowing through valve 45 enters the gas lift system 48 and is carried therein by means of gas stream furnished by blower 52 into the charcoal gas separator 53 and flows from this separator into hopper 54 at the top of the adsorption column. The gas employed in the gas lift system is removed from hopper 54 by means of line 55, the major portion thereof being returned by means of line 56 to the blower 52. The charcoal flows from hopper 54 through the cooling section 57 and through disengager 58 into adsorption section 11 to complete the cycle. The lean gas take-off valve 16 may be so controlled as to force a portion of the non-adsorbed components of the feed to flow countercurrently to the charcoal through the cooling tubes in cooler 57, and may be removed from the top of the column by means of line 55, a portion of which may be vented by means of line 59 controlled by valve 60 or this lean gas may be used as make-up gas to the gas lift system in which case it is returned to blower 52 by means of line 56.

Many modifications in the operation and in the design of the adsorption unit may be employed without departing from the present invention which comprises the usage of a new and improved type level control in conjunction with the adsorption process. For example it may be desirable to divide the operation, separating the processes of adsorption and stripping into two separate columns wherein, as in the above-described example, the heart cut would be obtained in the initial column by introducing the heavier components obtained in the stripping column as reflux to effect the desorption of the intermediate components. In another modification an elevator type charcoal conveyance may be employed in place of the gas lift system as described. In such case the charcoal flowing through the control valve 45 would be deposited in a bucket conveyer and carried directly to the top of the column or if two-column operation were employed the enriched charcoal flowing from the lower portion of the adsorption column would be transferred by an elevator to the top of the stripping column and the charcoal flowing from the lower portion of the stripping column would be conveyed by means of an elevator to the top of the adsorption column. It should be emphasized that if a two-column operation is employed it is highly desirable to employ a level control as herein described at the bottom of each of the columns so as to maintain a constant level therein.

Whereas the adsorption process is described with reference to a modified procedure wherein the heart cut is obtained from the gaseous feed it is to be understood that the present invention, pertaining to an improved method and apparatus for the control of the level of granular solids and for the usage of such apparatus in conjunction with the adsorption process, is equally effective when this process involves solely the adsorption of certain components from a gaseous mixture followed only by the subsequent recovery of the adsorbed components from the adsorbent by steam stripping or the like. Whereas, I do not intend to be limited to charcoal adsorption, charcoal is the preferred adsorbent particularly to the separation of hydrocarbon gases. The charcoal employed in the above process is preferably granular, about 10 to 20 mesh, although sizes as much as about 4 mesh and as small as about 100 mesh may also be employed. By "charcoal" herein is meant carbon or animal or vegetable charcoal, or the like, although an activated form of carbon or charcoal is preferred. After long usage small amounts of highly adsorbable material may be accumulated in the charcoal and hamper its efficiency in which case the charcoal may be withdrawn from the column and may be reactivated by high temperature steam treatment.

The process of this invention may be employed for the separation of any mixture of gases containing one or more components which are more readily adsorbable on the charcoal or other adsorbent than another component into two or more fractions depending upon the number of components in the feed and the particular process employed. The degree of adsorbability of gases on charcoal is generally higher for the gases of higher molecular weight. There appears to be correlation between adsorbability and critical temperature. Thus, gases of low critical temperature, such as hydrogen, nitrogen, oxygen, and carbon monoxide are adsorbed to a lesser degree than gases of higher critical temperature, such as chlorine, sulfur dioxide, hydrogen sulfide, ammonia, nitrous oxide, carbon dioxide and the like. Among the hydrocarbons there is a marked increase in adsorbability with molecular weight. Thus, the process may be employed for the separation of hydrocarbon vapors of higher molecular weight from those of lower molecular weight, as in the adsorption of natural gasoline from natural gas. It may also be used for purification or concentration of readily adsorbable gases, such as those shown, from mixtures in which they are contained.

The ratio of charcoal to feed gas required depends on the proportion of rich gas or highly adsorbable components in the feed and the degree of removal desired. As a possible explanation of its action, it appears that charcoal has a definite adsorptive capacity for each component of a gaseous mixture at a given temperature, which capacity is affected only slightly by the operating pressure. When a given amount of fresh charcoal is contacted with feed gas, the charcoal adsorbs all components of the gas to at least a slight degree. Its capacity to adsorb the least readily adsorbable constituents of the gas is soon exceeded, however, and thereafter it will not adsorb further amounts of these constituents, but will continue to adsorb the more readily adsorbable components. As it approaches its adsorptive capacity for each more readily adsorbable component, furthermore, there is a definite displacement of the less readily adsorbable material by the more readily adsorbable material. Thus, for a feed gas containing $C_1$ to $C_4$ hydrocarbons including butadiene, mixed with nitrogen, the use of a high ratio of charcoal to feed gas would result in more complete recovery of total hydrocarbons as make gas, and the use of a limited amount of charcoal would result in the production of a smaller amount of a make gas of higher $C_4$ hydrocarbon or butadiene content.

Whereas, particular emphasis has been placed upon the usage of the improved level control in conjunction with the charcoal adsorption process, it should be apparent to those skilled in the art that this level control will find application in any process or in any usage in which granular solids are caused to flow from a vessel and at the same time are employed to prevent ingress or egress of gases to or from this vessel. Such a situation may occur, for example, not only in the selective adsorption process as described, but in many catalytic processes such as cracking, dehydrogenation, and the like, as well as in various treating processes, etc. It is, therefore, within the scope of this invention to employ a level control as described in any operation in which the function thereof is of importance or is required.

Having described and illustrated my invention with respect to the principal elements thereof and its usage in conjunction with adsorption or other processes in which granular solids are employed and realizing that many modifications thereof will occur to those skilled in the art without departing from the spirit or scope of the foregoing description and the following claims, I claim:

1. An apparatus comprising a vessel, means for introducing granular solids into said vessel at a point substantially above the bottom thereof, an opening at the bottom of said vessel for discharging said granular solids from said vessel, and means for controlling the level of said granular solids in said vessel, said last named means comprising the combination of a receptacle disposed beneath said opening at the bottom of said vessel and adjacent thereto, a discharge tube disposed beneath said receptacle and adjacent thereto, a valve located in said discharge tube for regulating the flow of said granular solids through said discharge tube, a controller and a suspension arm connecting said receptacle with said controller, said receptacle and said suspension arm being free to move in a vertical direction with respect to said vessel and said discharge tube, said controller being adapted to operate said valve when actuated by said suspension arm and said receptacle being adapted to furnish means of restricted flow of said granular solids from said opening at the bottom of said vessel to said discharge tube.

2. An apparatus according to claim 1 wherein the receptacle is in the shape of a funnel having its flared portion in juxtaposition to the bottom opening of the vessel.

3. An apparatus according to claim 1 wherein the controller and the valve are operated by means of air pressure.

4. An apparatus according to claim 1 wherein the controller and valve are electrically operated.

5. An apparatus comprising a vessel, means for introducing granular solids into said vessel at a point substantially above the bottom thereof, an opening at the bottom of said vessel for discharging said granular solids from said vessel, means for controlling the level of said granular solids in said vessel, said last named means comprising the combination of a receptacle disposed beneath said opening at the bottom of said vessel and adjacent thereto, a discharge tube disposed beneath said receptacle and adjacent thereto, a valve located in said discharge tube for regulating the flow of said granular solids through said discharge tube, a controller, a suspension arm connecting said receptacle with said controller, said receptacle and said suspension arm being free to move in a vertical direction with respect to said vessel and said discharge tube, said controller being adapted to operate said valve when actuated by said suspension arm, and said receptacle being adapted to furnish means of restricted flow of said granular solids from said bottom opening of said vessel to said discharge tube, and means of conveying said granular solids from said discharge tube to said introducing means.

6. An apparatus for the separation of gaseous mixtures by selective adsorption comprising an adsorption column provided with an adsorption section, a stripping section and a cooling section, a solids feeder, a sealing leg below said feeder for substantially preventing undesirable gaseous flow while permitting solids flow, means for introducing said gaseous mixture to said adsorption section, means for removing the unadsorbed components of said gaseous mixture from said adsorption section, means for removing the adsorbed components of said gaseous mixture from said stripping section, means for introducing granular adsorbent at the top of said adsorption column, means for withdrawing said granular adsorbent from the bottom of said adsorption column, controlling means for controlling the level of accumulated granular adsorbent in said sealing leg, said controlling means comprising a movable receptacle disposed between said sealing leg and the bottom of the column, and means for conveying said granular adsorbent withdrawn from the bottom of said column to said introducing means at the top thereof.

7. An apparatus for the separation of gaseous mixtures by selective adsorption comprising an adsorption column provided with an adsorption section, a stripping section and a cooling section, a solids feeder, a sealing leg below said feeder for substantially preventing undesirable gaseous flow while permitting solids flow, means for introducing said gaseous mixture to said adsorption section, means for removing the unadsorbed components of said gaseous mixture from said adsorption section, means for removing the adsorbed components of said gaseous mixture from said stripping section, means for introducing granular adsorbent at the top of said column, means for withdrawing said granular adsorbent from an opening at the bottom of said column, which comprises means for controlling the level of said granular adsorbent in said sealing leg at the bottom of said vessel, said last named means comprising the combination of a receptacle disposed beneath said opening at the bottom of said column and adjacent thereto, a discharge tube disposed beneath said receptacle and adjacent thereto, a valve located in said discharge tube for regulating the flow of said granular solids through said discharge tube, a controller, and a suspension arm connecting said receptacle with said controller, said receptacle and said suspension arm being free to move in a vertical direction with respect to said vessel and said discharge tube, said controller being adapted to operate said valve when actuated by said suspension arm and said receptacle being adapted to furnish means of restricted flow of said granular solids from said opening at the bottom of said column to said discharge tube.

8. An apparatus for the separation of gaseous mixtures by selective adsorption and desorption in a moving bed of granular adsorbent which comprises an adsorption column provided with a cooling section, a stripping section, an adsorption section and at least two rectification sections disposed between said adsorption section and said stripping section, said sections being separated from each other by means of disengagers, means for introducing granular adsorbents at the top of said adsorption column, means for introducing said gaseous mixture to said adsorption section, means for removing the unadsorbed components of said gaseous mixture from said adsorption section, means for removing desorbed components of said gaseous mixture from the top of the second of said rectification sections, means for introducing reflux to the bottom of said second rectification section, means for removing desorbed components of said gaseous mixture from said stripping section, means for controlling the rate of flow of said granular adsorbent through said adsorption column, and a sealing leg before said controlling means, said sealing leg and said controlling means being located beneath said stripping zone and above the bottom opening of said adsorption column, means for controlling the level of accumulated granular adsorbent in said sealing leg, said controlling means comprising a movable receptacle disposed between said sealing leg and the bottom of the column, and means for conveying said granular adsorbent, withdrawn from the bottom of said adsorption column, to the inlet means at the top of said adsorption column.

9. An apparatus for the separation of gaseous mixtures by selective adsorption and desorption in a moving bed of granular adsorbent which comprises an adsorption column provided with a cooling section, a stripping section, an adsorption section and at least two rectification sections disposed between said adsorption section and said stripping section, said sections being separated from each other by means of disengagers, means for introducing granular adsorbents at the top of said adsorption column, means for introducing said gaseous mixture to said adsorption section, means for removing the unadsorbed components from said gaseous mixture from said adsorption section, means for removing desorbed components of said gaseous mixture from the second of said rectification sections, means for introducing reflux to the bottom of said second rectification section, means for removing desorbed components of said gaseous mixture from said stripping section, a solids feeder and a sealing leg at the bottom of said column for discharging said granular adsorbent, and means for controlling the level of said particle in said sealing leg which last named means comprises the combination of a receptacle disposed beneath said bottom opening of said column and adjacent thereto, a discharge tube disposed beneath said receptacle and adjacent thereto, a valve located in said discharge tube for regulating the flow of said granular solids through said discharge tube, a controller and a suspension arm connecting said receptacle with said controller said receptacle and said suspension arm being free to move in a vertical direction with respect to said vessel and said discharge tube, said controller being adapted to operate said valve when actuated by said suspension arm, and said receptacle being adapted to furnish means of restricted flow of said solid particles from said bottom opening of said column to said discharge tube.

10. A continuous process for the separation of gaseous mixtures by selective adsorption and desorption which comprises contacting said gaseous mixture with a moving stream of granular solid adsorbent flowing downwardly in an adsorption column so as to cause adsorption of the more readily adsorbable components of said gaseous mixture by said adsorbent, separating the unadsorbed components of said gaseous mixture from the enriched adsorbent, stripping the remaining adsorbed components from the adsorbent by heating said enriched adsorbent while it is moving downwardly and simultaneously passing therethrough a countercurrent stream of stripping gas, causing a portion of the resultant stripped components of said gaseous mixture to flow countercurrently to the downwardly flowing bed of enriched adsorbent to effect the selective desorption of any undesirable components adsorbed thereon, withdrawing the remainder of the stripped components from said adsorption column, allowing said stripped adsorbent to flow through a feeder whereby the rate of adsorbent flow through said adsorption column is controlled, allowing said adsorbent to flow from said feeder into a sealing leg in the bottom portion of said adsorption column, and maintaining the level of accumulated adsorbent in said sealing leg by allowing said adsorbent to flow from a bottom opening in said column into a receptacle mounted beneath the bottom opening of said adsorption column and suspended independently from said adsorption column and in such a manner that it is free to move in a downwardly or upwardly direction, which motion is a function of the static pressure of the accumulated granular adsorbent exerted on said receptacle, allowing said granular adsorbent to flow from said receptacle into a discharge tube, the outlet of which is controlled by a valve operated automatically by controlling means, said controlling means being actuated by the motion of said receptacle, and conveying said granular adsorbent from the outlet of said discharge tube to the top of said adsorption column.

11. A continuous process for the separation of a gaseous mixture by selective adsorption and desorption which comprises contacting said gaseous mixture with a stream of granular solid adsorbent, introduced at the top of an adsorption column, so as to cause adsorption of the more readily adsorbable components of said gaseous mixture by said adsorbent, separating the unadsorbed components of said gaseous mixture from the enriched adsorbent, desorbing a portion of the adsorbed components from the enriched adsorbent by means of refluxing said enriched adsorbent with further quantities of the more readily adsorbable components of said gaseous mixture, separating the thus desorbed fraction of said gaseous mixture from the adsorbent, stripping the remaining adsorbed components from the adsorbent by heating said adsorbent while it is moving downwardly and simultaneously passing therethrough a countercurrent stream of stripping gas, causing a portion of the stripped components to flow countercurrently to the downwardly flowing bed of granular adsorbent to effect the selective desorption of a fraction of the adsorbed components, removing the remainder of the stripped components from the adsorbent, allowing said stripped adsorbent to flow through a feeder whereby the rate of adsorbent flow through said adsorption column is controlled, allowing said adsorbent to flow from said feeder into a sealing leg in the bottom portion of said adsorption column, and maintaining the level of accumulated adsorbent in said sealing leg by allowing said adsorbent to flow from a bottom opening in said column into a receptacle mounted beneath the bottom opening of said adsorption column and suspended independently from said adsorption column in such a manner that it is free to move in a downwardly or upwardly direction, which motion is a function of the static pressure of the accumulated granular adsorbent exerted on said receptacle, allowing said granular adsorbent to flow from said receptacle into a discharge tube, the outlet of which is controlled by a valve operated automatically by controlling means, said controlling means being actuated by the motion of said receptacle, and conveying said granular adsorbent from the outlet of said discharge tube to the top of said adsorption column.

12. An apparatus which comprises a vessel, a communicating elongated cylindrical discharge tube, a valve located in the lower portion of said discharge tube, means for introducing granular solids into the upper portion of said vessel, and means for maintaining a continuous moving bed of said solids extending upwardly from said valve to a constant level of said solids in said vessel, said last named means comprising a movable receptacle adapted to receive the solids leaving the bottom of said vessel and discharge them into said discharge tube, and to furnish a restriction in the flow of solids therethrough, a controller and a suspension arm connecting said receptacle with said controller, said receptacle and said suspension arm being free to move with respect to said vessel and said discharge tube in accordance with the level of said granular solids in said vessel, and said controller being adapted to operate said valve when actuated by said suspension arm.

CLYDE H. O. BERG.

REFERENCES CITED

The following references are of record in the file of this patent:

UNITED STATES PATENTS

| Number | Name | Date |
|---|---|---|
| 1,115,193 | Hay | Oct. 27, 1914 |
| 1,422,007 | Soddy | July 4, 1922 |
| 2,360,787 | Murphree | Oct. 17, 1944 |
| 2,384,311 | Kearby | Sept. 4, 1945 |
| 2,397,566 | Schutte | Apr. 2, 1946 |

FOREIGN PATENTS

| Number | Country | Date |
|---|---|---|
| 618,502 | Germany | Sept. 10, 1935 |